April 10, 1962 A. P. LANG 3,029,080

MAGNETIC RECORDING APPARATUS

Filed June 29, 1953 3 Sheets-Sheet 1

INVENTOR.
Albert P. Lang

BY

Synnestvedt & Lechner
ATTORNEYS.

MAGNETIC RECORDING APPARATUS

Filed June 29, 1953 3 Sheets-Sheet 2

INVENTOR.

Albert P. Lang

BY

Synnestvedt & Lechner

ATTORNEYS.

INVENTOR
Albert P. Lang

Synnestvedt & Lechner
ATTORNEYS

United States Patent Office 3,029,080

Patented Apr. 10, 1962

3,029,080
MAGNETIC RECORDING APPARATUS

Albert P. Lang, Philadelphia, Pa., assignor, by mesne assignments, to Armour Research Foundation of Illinois Institute of Technology, Chicago, Ill., a corporation not-for-profit of Illinois

Filed June 29, 1953, Ser. No. 364,877
13 Claims. (Cl. 274—17)

This application is a continuation-in-part of my application, Serial No. 12,023, filed February 28, 1948, entitled Magnetic Recording Apparatus, now abandoned.

This invention relates to sound recording and reproducing equipment, and, more particularly, has to do with mechanism for effecting scanning of a record surface by a transducer and with novel means for mounting and propelling such a transducer.

The invention has particular application to office dictation machines of the type disclosed in co-pending application, Serial No. 11,993, entitled Magnetic Recording Machine, filed February 28, 1948, in which application are claimed other features of the office dictation equipment disclosed herein.

One of the objects of the present invention is to provide an improved mounting for a dictating machine carriage arranged to permit effortless movement of the carriage in a scanning path parallel to a recording surface and movement toward and away from the recording surface.

A further object of the invention is, in a mounting of the type described, to restrict carriage movement to the two senses above mentioned, and at the same time to permit unimpeded movement in the desired senses.

More specifically, this aspect of the invention is concerned with mechanism for supporting a dictating machine carriage entirely from a way extending parallel to the scanning path in a manner to permit free movement of the carriage along the way and also to permit free oscillation of the carriage about the way.

Another object of the invention is to provide for manually shifting a dictating machine carriage in either direction along the scanning path by applying a force to the carriage at a point substantially removed from the carriage mounting.

A further object of the invention is to eliminate binding of the carriage mounting upon application of a carriage shifting force from a point substantially removed from the carriage mounting.

According to another aspect of the invention, provision is made for step-by-step propulsion of a dictating machine carriage along the carriage way in a manner which is readily adaptable to electrical control.

Still further, according to this aspect of the invention, provision is made for cushioning the application of step-by-step backspacing force to the carriage.

The invention also contemplates the elimination of damage to the equipment upon operation of the carriage backspacing mechanism when the carriage is already at the limit of its backward travel. More specifically, such damage is eliminated by the provision of cushioning mechanism capable of absorbing the full stroke of the backspacing mechanism when the carriage has reached its limit of backspacing movement.

Beyond the foregoing, the invention contemplates the novel structure of certain elements of the backspacing mechanism, as an example of which may be mentioned my novel, shiftable backspacing bar.

How the foregoing and other objects are attained will appear more fully upon consideration of the description which follows hereinbelow, and the drawings, in which.

Figure 1:
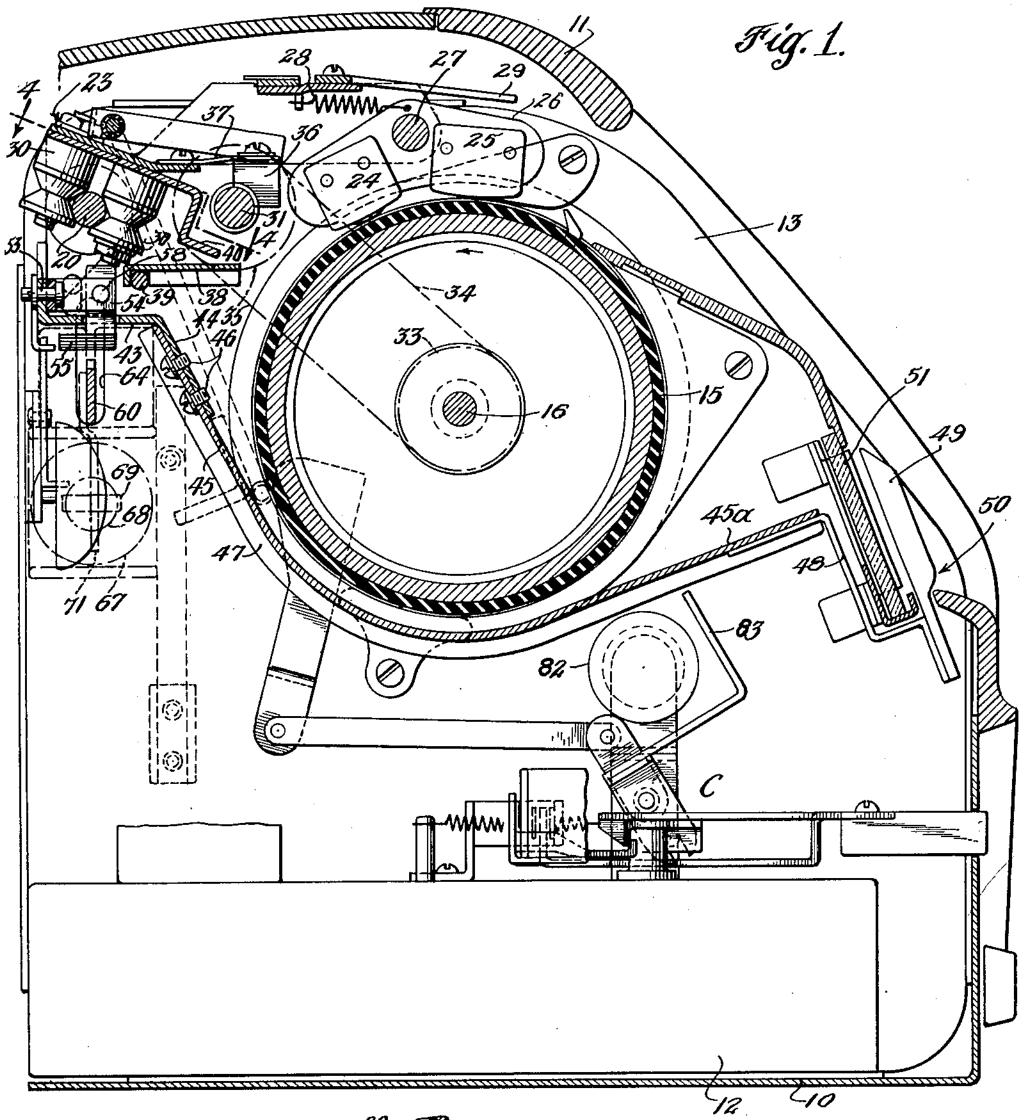
FIGURE 1 is a sectional view, taken substantially on the line 1—1 of FIGURE 2, of a dictating machine of the type more fully described in said copending application Serial No. 11,993, entitled Magnetic Recording Machine, and assigned to the assignee of the present invention.
Figure 4:
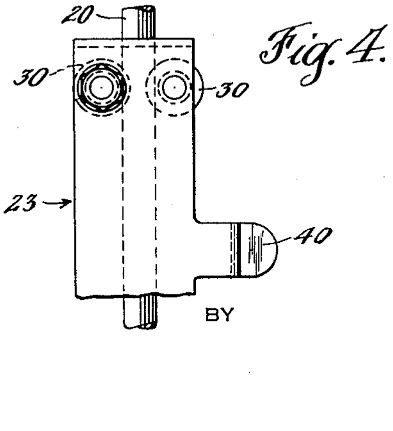
FIGURE 4 is a fragmentary view of a portion of the carriage structure as indicated by the line 4—4 in FIGURE 1.
Figure 2:
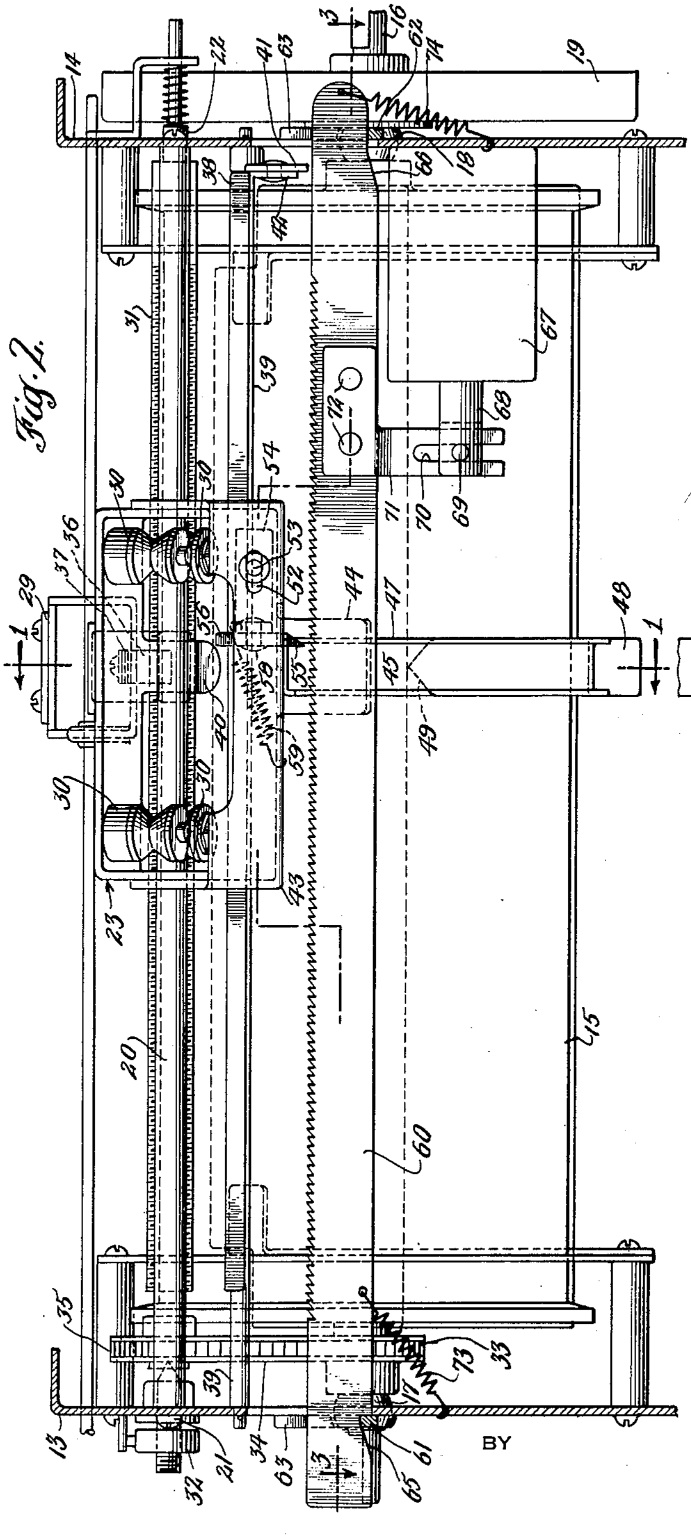
FIGURE 2 is a rear view of the machine of FIGURE 1, partly in elevation and partly in section.
Figure 3:
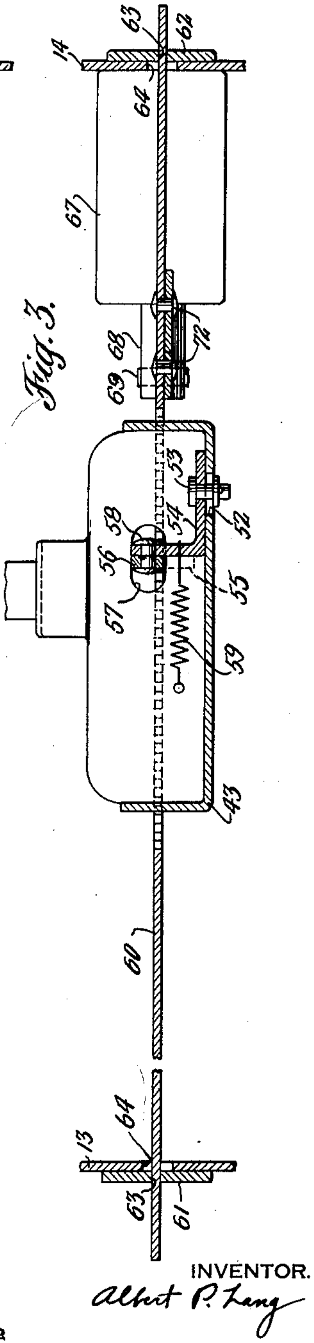
FIGURE 3 is a horizontal sectional view through a portion of the mechanism taken along the line 3—3 on FIGURE 2.

The embodiment of the invention disclosed in the drawings is applied to an office dictating machine assembled upon a metallic base structure 10 (see FIGURE 1), to which are secured a cabinet 11, an electronic chassis 12, and a scanning assembly supported by a pair of end plates 13 and 14 (see FIGURE 2). A record-supporting mandrel 15 is mounted upon a shaft 16, which shaft is journalled in end plates 13 and 14 by bearings 17 and 18. Torque is transmitted to shaft 16 and mandrel 15 through a driving wheel 19 adapted to be driven by a drive mechanism not pertinent to the present invention. A circular rod 20, secured to end plates 13 and 14 by screws 21 and 22, extends axially of mandrel 15 and provides a way upon which an upper carriage member 23 is adapted to ride.

Upper carriage member 23 supports a pair of transducers 24 and 25, for example, a magnetic recording-reproducing head and a magnetic erasing head. Transducers 24 and 25 are secured to an equalizer arm 26, pivotally mounted on member 23 by a pin 27. A spring 28 tends to cock equalizer 26 rearwardly on pin 27 (as seen in FIGURE 1), resulting in the application of greater pressure on head 24 than on head 25, which thus eliminates the tendency of the heads to chatter on the surface of mandrel 15 when the mandrel is rotated. As will later appear, upper carriage member 23 is adapted to rock about rod 20, and in order to prevent extreme oscillation of equalizer 26 about pivot 27 under the impetus of spring 28, a stop member 29 is positioned to engage the front portion of equalizer 26 after limited oscillation thereof about pivot 27.

Carriage member 23 is mounted for translational movement on rod 20 and for oscillation about the axis of rod 20 by means of four rollers 30 arranged in opposed pairs at either end of carriage member 23. As may be seen, the surface of each roller 30 is of V-section, whereby the rollers not only provide a bearing surface for the carriage, but also maintain the carriage in fixed position relative to the axis of rod 20.

This carriage mounting provides for rolling contact between the carriage and the way during scanning and thus reduces the effort required to shift the carriage. At the same time, the separation of the roller pairs along the way and tight engagement of the rollers with the way prevent oscillation of the carriage about axes perpendicular to the axis of the way, which, particularly in the case of oscillation about the vertical perpendicular to the axis of the way, affects the accuracy of registration of the transducers on the medium. It is of particular importance in recording equipment of the magnetic type that the carriage mounting be rigid, as the registration of the transducer with a record track is determined entirely by the position of the carriage. While carriage rigidity is also important in recording equipment of the mechanical type, the guiding effect of a record groove determines the position of the stylus within the rough limits established by the carriage position. As will be seen in the figures, the transducers, according to the present invention, are supported by an equalizer lying in a vertical plane intermediate the planes of the opposed pairs of rollers 30 and the point of contact of the transducers with the record surface is comparatively close to a plane containing the axis of the way and the centers of the opposed rollers.

Furthermore, the employment with the grooved rollers of a way having a circular profile permits oscillation of the carriage as a whole about the axis of the way without introducing freedom for oscillation about any other axis. Thus, the carriage is free for unimpeded movement in the scanning path and for oscillation about the axis of the way, but is rigorously restricted as to motion in any other sense.

During normal scanning of a record on mandrel 15, translational force from a right to left direction as viewed in FIGURE 2 is transmitted to upper carriage member 23 by means of a lead screw 31, rotatably journalled in end plates 13 and 14 with freedom for axial adjustment upon manipulation of a nut 32, in the manner more fully described in copending application Serial No. 740,653, assigned to the assignee of the present application. Lead screw 31 is adapted to be rotatably driven from mandrel shaft 16 by means of a sprocket 33, chain 34 and sprocket 35.

Lead screw 31 is adapted to engage a half-nut 36 mounted on carriage member 23 by a strip 37 of resilient material, which is adapted to yieldingly press half-nut 36 against lead screw 31, but which is sufficiently stiff in a lateral sense to transmit driving force to carriage 23.

It will be seen, therefore, that when driving force is applied to wheel 19, mandrel 15 will rotate with shaft 16, and carriage member 23, carrying transducers 24 and 25, will be propelled axially of the mandrel, resulting in the scanning of a helical track on a record surface supported by mandrel 15.

To provide for shifting of upper carriage member 23 along rod 20 when the normal scanning mechanism is at rest, the carriage member 23 is "rocked back" in a counter-clockwise direction about rod 20 by a linkage associated with the mechanism for controlling the application of driving force to wheel 19. Complete descriptions of this mechanism will be found in said copending applications Serial No. 11,993, entitled Magnetic Recording Machine; and Serial No. 24,827 entitled Drive Control Mechanism for Magnetic Recording Apparatus, filed May 3, 1948, both of which are assigned to the assignee of the present invention. However, it may be noted that a rocking force is applied to carriage member 23 by a tilt bar 38 extending across the machine between end plates 13 and 14 and supported at its rear edge by a rod 39, which is journalled in the end plates. In its horizontal position, which the tilt bar occupies during normal scanning, it underlies the path of movement of a tab 40 formed on carriage member 23 and extending forwardly and downwardly therefrom. As may be seen in FIGURE 2, a push rod 41, which is pivotally secured to an ear 42 formed on tilt bar 38, extends downwardly in the direction of the control mechanism disclosed in the copending applications to which reference has already been made. When the driving connection to wheel 19 is broken, as during a pause in dictation, push rod 41 moves upwardly, rocking tilt bar 38 about rod 39 and raising tab 40 and carriage member 23 to a position in which heads 24 and 25 clear the surface of mandrel 15 and half-nut 36 clears the threads of lead screw 31. It will therefore be clear that when the drive mechanism is disconnected, the carriage 23 may be moved freely along rod 20 in either direction.

Figure 5:
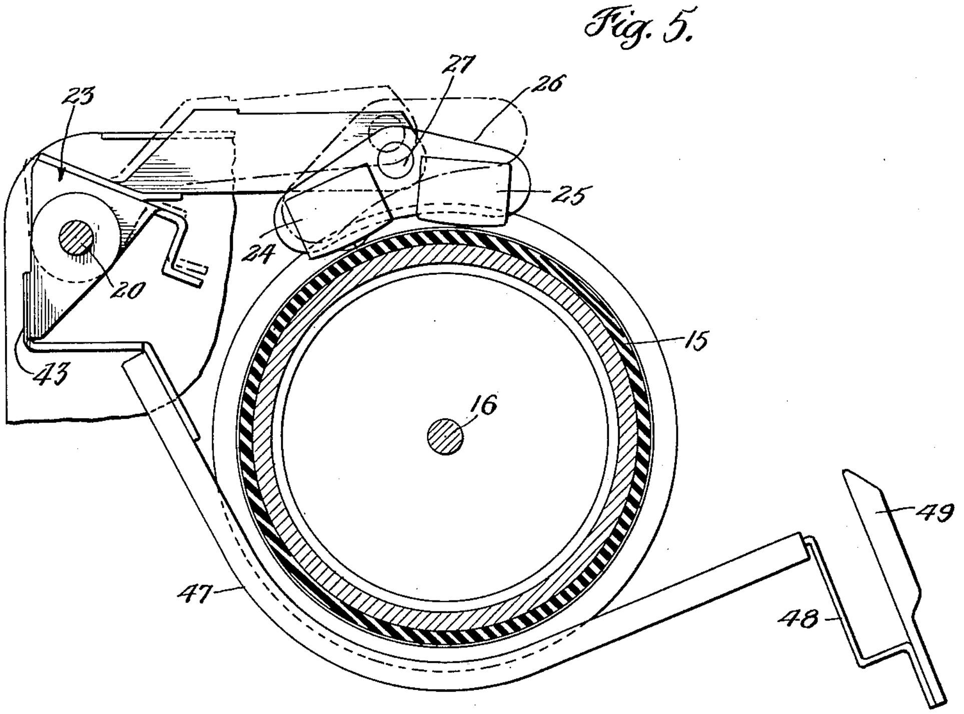
FIGURE 5 is a simplified sectional view, taken along the line 1—1 of FIGURE 2, of a portion of the machine shown in FIGURE 1 and illustrating the oscillatory movement of a portion of the carriage assembly.

When upper carriage member 23 is in the "rocked-back" position illustrated in dot-dash outline in FIGURE 5, and half-nut 36 and lead screw 31 are disengaged, translational movement of member 23 along way 20 is effected by means of a lower carriage member 43.

As may be seen in FIGURE 2, carriage member 43 is generally U-shaped, the two legs of the U embracing the outside surfaces of the two corresponding legs of upper carriage member 23. The legs of lower carriage member 43 are pierced by apertures to accommodate way 20, which accordingly maintains the two carriage members in alignment with one another. Translational forces applied to lower carriage member 43 are therefore transmitted to upper carriage member 23 which latter, however, is free to oscillate about the axis of way 20 independently of lower member 43.

Figure 6:
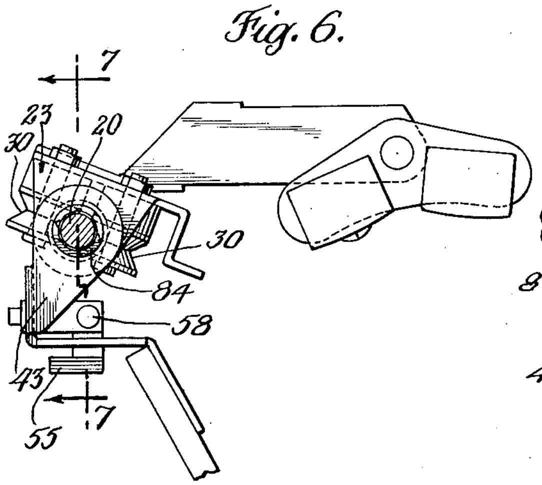
FIGURE 6 is a simplified view illustrating a modification of the carriage mounting mechanism of FIGURES 1 and 5.
Figure 7:
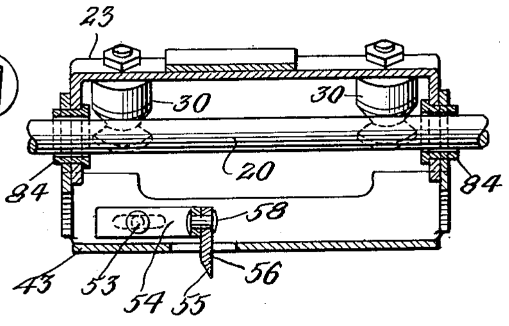
FIGURE 7 is a vertical sectional view of the modification of FIGURE 6 taken along the line 7—7 of FIGURE 6.

In the embodiment illustrated in FIGURES 6 and 7, lower carriage member 43 is journalled on sleeves 84 which are mounted on upper carriage 23 and which are dimensioned to provide clearance between their internal surfaces and surface of way 20, thus eliminating contact between lower carriage member 43 and way 20, so that the position of member 43, as well as that of member 23, is determined by the rollers 30.

According to the present invention, two separate means are provided for shifting the position of the carriage assembly, namely, an electromechanical backspacing mechanism for effecting backspacing movement of the carriage assembly in a step-by-step manner; and, secondly, a handle by which the carriage assembly may be manually shifted in either direction to any desired position in its path of travel along rod 20.

Considering first the manual means for shifting the carriage, it is pointed out that lower carriage member 43 carries a tab 44. A strap 45 is secured to tab 44 by screws 46. Strap 45 extends downwardly and thence curves under mandrel 15 at a slight distance therefrom and thence extends upwardly, terminating in a straight portion 45*a* forward of the foremost portion of the mandrel. Strap 45, which is inherently stiff in the lateral sense, is strengthened by flanges 47. Forward portion 45*a* of strap 45 supports a bracket 48 on which is mounted a combination pointer and handle 49 extending through a slot 50 in cabinet 11. The relationship between bracket 48, pointer 49, the frame of scale 51 and the surfaces defining slot 50 are such as to constrain strap 45 from movement in a vertical sense, and accordingly to constrain the lower carriage member 43 against oscillatory movement about the axis of way 20. It will be observed that the body of pointer 49 is intersected by a plane containing the axis of rod 20 and normal to the axes of rollers 30. Accordingly, lateral pressure applied to pointer-handle 49 is transmitted to the carriage assembly in a manner to propel the carriage assembly along rod 20 without binding. I have observed that this location of pointer-handle 49 relative to the line of centers of rollers 30 is fairly critical, and that the application of pressure to a part of the system angularly offset from the plane above referred to mitigates against the smooth application of a shifting force to the carriage.

The presence of the sleeves 84 illustrated in FIGURES 6 and 7 reduces the number of rollers required to obtain smooth operation, for example, the two back rollers at the far side of the way from the handle-pointer may be eliminated to simplify the construction without increasing significantly the shifting force required to be applied to the handle-pointer to shift the carriage assembly, as will be understood upon consideration of the discussion just below.

When a translational force is applied to the carriage, for example through pointer-handle 49, the carriage assembly tends to cock about an axis normal to the plane in which the force is applied. In the absence of any roller, the sleeve 84 at the leading end of the carriage will tend to "dig in" to the rod 20. A single roller mounted at the leading end of the carriage and on the side of the way from which the force is applied will eliminate this condition. The cocking involved will also bring the sleeve at the trailing end of the carriage into contact with the way, but at an angle which does not result in binding. Accordingly, the presence of the sleeves and a single roller will provide for smooth application of a translational force in one direction. A second roller at the opposite end of the carriage, but again on the side of the carriage from which the force is applied, will permit a translational force to be applied in either direction without binding. When four rollers are employed, as in the preferred embodiment, even the residual friction of the sleeve against the opposite side of the rod at the trailing end of the carriage is eliminated.

It should be noted at this time that in its movement across the front of cabinet 11, pointer 49 traverses a scale 51 of translucent or transparent material, which, as has been pointed out in copending application, Serial No. 11,993, is adapted to be illuminated by a lamp 82 between which and scale 51 a colored screen 83 of transparent or translucent material is adapted to be interposed or withdrawn in accordance with the position of adjustment of the control mechanism C which conditions the apparatus alternately for recording and reproducing.

Turning now to the second means for shifting the carriage assembly, it will be seen that lower carriage member 43 is pierced by a horizontal slot 52, which slot is penetrated by a rivet 53 which serves to secure a bracket 54 to member 43. As may be seen, horizontal slot 52 is large enough to permit horizontal movement of bracket 54 relative to member 43. A pawl 55, having a shank 56 which passes through an aperture 57 in member 43, is secured to bracket 54 by a rivet 58. A spring 59 maintains bracket 54 and pawl 55 in their most leftwardly position of movement as viewed from the rear of the machine.

A movable rack 60 extends completely across the machine in a position just below pawl 55 and is supported by a pair of wear plates 61 and 62, each of which is penetrated by a slot 63 aligned with a larger slot 64 in each of end plates 13 and 14. As viewed in FIGURE 2, the left end of the lower surface of rack 60 is ground out at an angle, as at 65, to provide an inclined surface which is adapted to engage the bottom of the slot 63 in wear plate 61. A second surface 66, parallel to the surface 65, is formed at the right end of rack 60 and similarly engages the bottom of the slot 63 in wear plate 62. The surfaces 65 and 66 are inclined in the same sense as the inclined surfaces of the teeth of rack 60, that is to say, upwardly and in the backspacing direction.

Rack 60 is adapted to be shifted by a solenoid 67, which is mounted on end plate 14. The armature 68 of solenoid 67 carries a pin 69 which is adapted to engage with a slot 70 in a bracket 71 secured to rack 60 by a pair of rivets 72.

Rack 60 is resiliently urged downwardly and to the left (as viewed in FIGURE 2) by a spring 73 interconnecting the left end of rack 60 and end plate 13 and by a second spring 74 interconnecting the right end of rack 60 and end plate 14. Springs 73 and 74 serve to restore rack 60 to its normal position after solenoid 67 has been deenergized, and also serve to stabilize the engagement between the inclined surfaces 65 and 66 with wear plates 61 and 62.

The circuit of solenoid 67 may be completed through a switch or switches which may be coordinated with other control elements of the machine, for example, in the manner disclosed in copending application Serial No. 11,993, entitled Magnetic Recording Machine.

In operation, when solenoid 67 is energized, rack 60 shifts to the right, as viewed in FIGURE 2. As a result of the cooperation between inclined surfaces 65 and 66 and the bottoms of slots 63, the horizontal motion of rack 60 is accompanied by a vertical motion which ultimately results in the engagement of rack 60 with pawl 55. As the horizontal motion of rack 60 continues, pawl 55 and bracket 54 are moved to the right relative to the carriage assembly against the tension of spring 59 until the force transmitted to the carriage through spring 59 is sufficient to overcome the inertia of the carriage, whereupon the carriage assembly itself moves to the right by a distance determined by the stroke of the armature 68 and the tension of spring 59.

Spring 59 performs two functions. First, it absorbs the initial shock of contact between rack 50 and pawl 55, which would otherwise project the carriage a relatively great distance along rod 20; and, in addition, the arrangement of bracket 54, pawl 55 and spring 59 is such that if the backspacing mechanism be energized when the carriage is at its point of furthest advance to the right, as viewed in FIGURE 2, the spring 59 will absorb the full stroke of the backspacing mechanism and thus avoid damage to the equipment.

I claim:

1. In an office dictation machine comprising a rotatable support for a record and a record-cooperable translating device for scanning a record carried by said support: the combination of a carriage member carrying said translating device; a support rod for said member along which said member is moved as a record is scanned and about which said member is rocked to engage and disengage said device with a supported record; and means mounting said member on said rod for translational movement therealong and rocking thereabout comprising a plurality of grooved rollers mounted on said member and engaging said rod in the same axial plane thereof, two of said rollers engaging said rod from opposite sides thereof, and a third of said rollers engaging said rod in a position spaced substantially along said rod from one of said two rollers.

2. A machine as set forth in claim 1 and including a second carriage member interconnected with said first member to provide for conjoint translational movement therewith along said rod; and a handle secured to said second member for effecting conjoint translational movement of said members, said handle being substantially in said plane when said first member is rocked to effect disengagement of said translating device with a supported record.

3. A machine as set forth in claim 1 and including a second member interconnected with said first member to provide for conjoint translational movement therewith along said rod; means constraining said second member from rocking movement about said rod; and a drive mechanism including a drive transmitting member extending along said rod and cooperative with said second member to effect conjoint translational movement of said two members.

4. A machine in accordance with claim 3 and further including a pawl extending from said second member in a plane containing the axis of said rod, and in which said drive mechanism cooperates with said pawl in effecting said translational movement.

5. A machine in accordance with claim 4 in which said drive mechanism includes a rack extending along said rod and mounted for movement parallel to said rod and for movement toward said pawl in the plane of said pawl.

6. A machine in accordance with claim 5 and further including means for effecting movement of said rack toward said pawl and thereafter effecting movement of said rack in a path parallel to said rod.

7. A machine in accordance with claim 6 and further including pin and slot linkage interconnecting said rack and said last means, and adapted to accommodate said two movements.

8. A machine as set forth in claim 1 and including a second carriage member interconnected with said first member for conjoint translational movement therewith along said rod; means constraining said second member from rocking movement about said rod; a feed screw extending along said support rod; means on said first member engageable with said feed screw when the first member is rocked to effect engagement of said translating device with a supported record for effecting progressive advance movement of said translating device across the record; and drive means including a back space rack extended along said rod and operable on said second carriage member for effecting step-by-step back-spacing of said translating device across a supported record.

9. In a dictating machine comprising a carriage and a carriage way, a pawl projecting from said carriage and yieldingly mounted for movement relative to said carriage in a direction parallel to said way in a manner to yieldingly transmit carriage-shifting force to said carriage, a rack disposed parallel to said way, and mechanism for moving said rack into engagement with said pawl and thereafter moving said rack in a direction parallel to said way.

10. A construction in accordance with claim 9 and further including a spring interconnecting said pawl and said carriage for yieldingly transmitting carriage-shifting force from said pawl to said carriage.

11. A construction according to claim 10 in which the range of relative movement through which said spring yieldingly transmits said force is at least equal to the range of movement of said rack after engagement with said pawl.

12. In a dictating machine of the type comprising a record-supporting mandrel, a transducer adapted to scan a record supported by said mandrel, a carriage for said transducer and an elongated way for said carriage extending parallel to the axis of said mandrel, a mounting providing for translational movement of the carriage along the way and rocking movement of the carriage about the axis of the way, comprising a pair of opposed grooved rollers embracing said way, and a handle for shifting said carriage along said way disposed on the opposite side of the record supporting mandrel in an axial plane of said way normal to the axis of said rollers.

13. A construction in accordance with claim 12 and further including a scale extending parallel to the axis of said mandrel and adapted to cooperate with said handle to indicate the position of the carriage along the way.

References Cited in the file of this patent

UNITED STATES PATENTS

| | | |
|---|---|---|
| 744,267 | Weber | Nov. 17, 1908 |
| 1,842,550 | Holland | Jan. 26, 1932 |
| 1,856,344 | Leopold | May 3, 1932 |
| 2,223,723 | Fox | Dec. 3, 1940 |
| 2,435,260 | Wise | Feb. 3, 1948 |

FOREIGN PATENTS

| | | |
|---|---|---|
| 205,451 | Germany | Jan. 4, 1909 |
| 351,469 | Great Britain | June 25, 1931 |
| 168,192 | Switzerland | Mar. 31, 1934 |
| 836,487 | France | Sept. 18, 1939 |